(12) United States Patent
Yadav et al.

(10) Patent No.: US 12,505,018 B2
(45) Date of Patent: Dec. 23, 2025

(54) ENABLING PREDICTIVE RESTORATION OF SPECIALIZED DIRECTORY SERVICE ASSETS

(71) Applicant: Dell Products L.P., Round Rock, TX (US)

(72) Inventors: Sunil Yadav, Punjab (IN); Shelesh Chopra, Bangalore (IN)

(73) Assignee: Dell Products L.P., Round Rock, TX (US)

(*) Notice: Subject to any disclaimer, the term of this patent is extended or adjusted under 35 U.S.C. 154(b) by 165 days.

(21) Appl. No.: 18/356,294

(22) Filed: Jul. 21, 2023

(65) Prior Publication Data

US 2025/0028603 A1  Jan. 23, 2025

(51) Int. Cl.
  *G06F 11/14* (2006.01)
(52) U.S. Cl.
  CPC ...... *G06F 11/1451* (2013.01); *G06F 11/1464* (2013.01); *G06F 11/1469* (2013.01)
(58) Field of Classification Search
  CPC ............ G06F 11/1446; G06F 11/1456; G06F 11/1471; G06F 11/1658; G06F 11/1662; G06F 11/2056; G06F 11/2064; G06F 11/2082; G06F 2201/84
  See application file for complete search history.

(56) References Cited

U.S. PATENT DOCUMENTS

| | | | | |
|---|---|---|---|---|
| 8,666,938 | B1* | 3/2014 | Pancholy | G06F 9/455 707/831 |
| 8,805,790 | B1* | 8/2014 | Chan | G06F 16/1824 707/652 |
| 2014/0282488 | A1* | 9/2014 | Tagliabue | G06F 8/62 717/174 |
| 2015/0293760 | A1* | 10/2015 | Alevoor | G06F 9/4451 717/169 |
| 2020/0334275 | A1* | 10/2020 | Saad | G06F 11/2094 |
| 2024/0264908 | A1* | 8/2024 | Subramanian | G06F 3/0644 |
| 2024/0311033 | A1* | 9/2024 | Subramanian | G06F 3/0679 |
| 2024/0329870 | A1* | 10/2024 | Subramanian | G06F 3/065 |
| 2025/0028828 | A1* | 1/2025 | Yadav | G06F 11/1451 |

* cited by examiner

*Primary Examiner* — Kamini B Patel
(74) *Attorney, Agent, or Firm* — Chamberlain, Hrdlicka, White, Williams & Aughtry; Aly Z. Dossa

(57) ABSTRACT

A method for managing access to a file based backup (FBB) includes generating, two backup snapshots, each at two points-in-time and each associated with a set of files, comparing the first backup snapshot and the second backup snapshot to generate a difference snapshot, wherein the difference snapshot specifies a third set of files that are different between the first set of files and the second set of files, providing a recovery notification to an application accessing the asset, wherein the recovery notification specifies recovering a file in the third set of files, obtaining a selection of the file in the third set of files from the application, and in response to the selection, performing a recovery of the file.

14 Claims, 9 Drawing Sheets

ENABLING PREDICTIVE RESTORATION OF SPECIALIZED DIRECTORY SERVICE ASSETS

BACKGROUND

Computing devices in a system may include any number of internal components such as processors, memory, and persistent storage. The storage of data across multiple computing devices may require significant use of such internal components. Performing deduplication on such data prior to storage may improve the overall operation of such computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
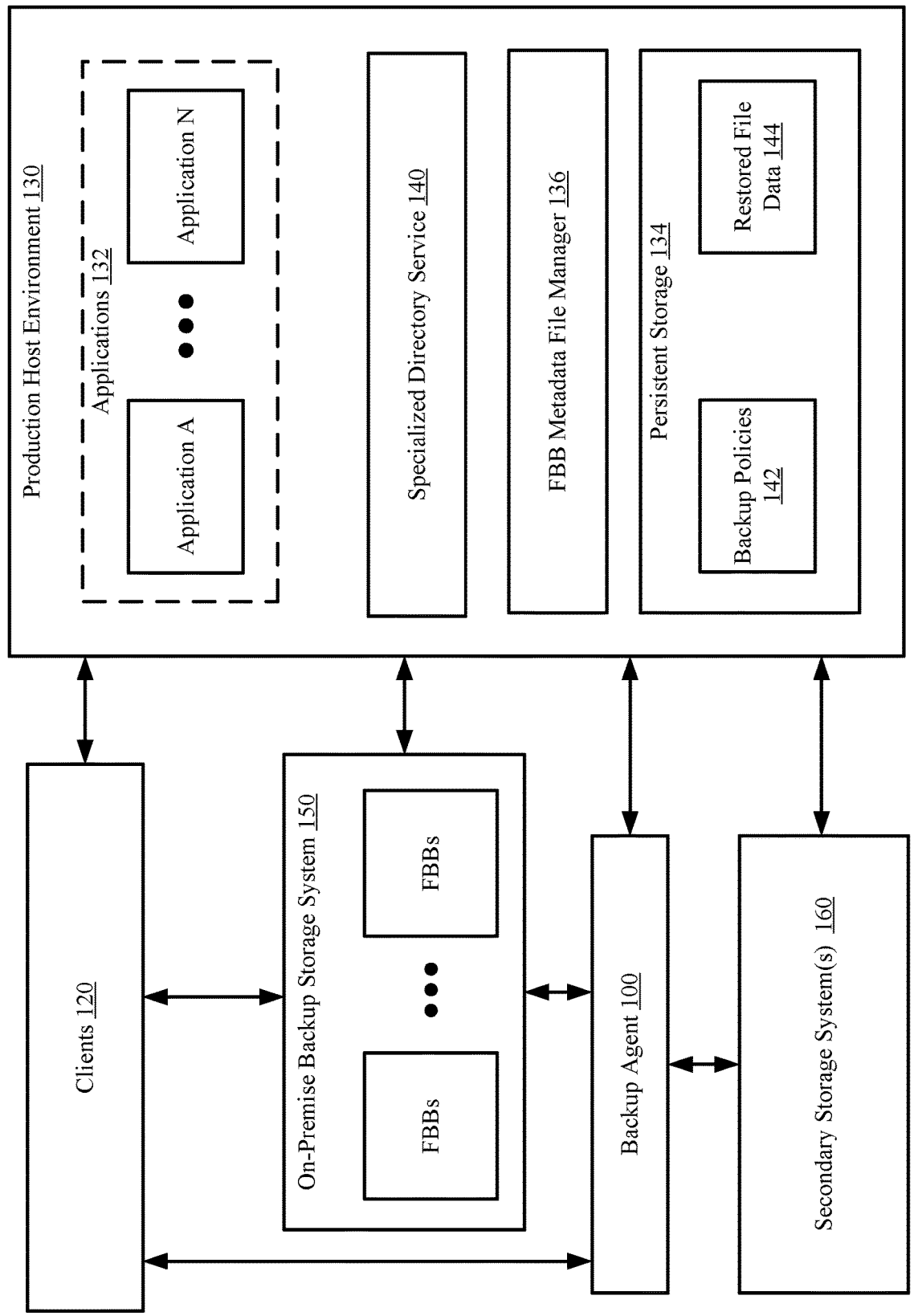
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing file based backups. Embodiments of the invention relate to a system for utilizing a file based backup (FBB) metadata file of a FBB stored in a backup storage system to enable access to the data of the FBB by an application managing the file system corresponding to the FBB. The application may operate from a production host environment that is operatively connected to the backup storage system. The FBB metadata file may be utilized by obtaining attributes corresponding to the data in the FBB, including the storage location, file name, and file size, and allowing access to those attributes by the applications. A FBB metadata file manager executing on the production host environment may utilize the obtained attributes to enable access to the data (e.g., the files) in the FBB by the applications. For example, the FBB metadata file manager may implement a virtual file system that specifies the files in the file based backup and the storage location in the backup storage system.

Embodiments disclosed herein address the use case for using different retentions and/or tiering post-backup on the different data segments of a large asset which are backed as composite data. Embodiments disclosed herein include reducing the complexity of managing multiple schedules, policies, and distributions before and during backup generation. Once a backup is done, sub-data assets are created dynamically based on attributes of the assets (e.g., whether the asset is associated with a specialized directory service). Each of the sub-assets may have different retentions. For example, an entire file system may be protected as a single asset, but post backup, specialized directory service and non-specialized directory service data may split intelligently, and sub-data assets are created. These sub-assets may be associated with different retention and tiering policies further based on the importance of the data and user preferences.

Embodiments disclosed herein further include methods and systems for enabling a predictive restoration of assets associated with a specialized directory service. A specialized directory service may host a wide range of mission critical information starting from users and passwords and other identity management data. Sometimes critical information is lost inadvertently and recovering such information from a huge set of data may be a difficult task. Users would have to search deleted or files prior to modification from previous backups in the backup storage system (or any other secondary storage system) and then attempt to restore, which may be time consuming. Embodiments disclosed herein enables solutions to keep any deleted or recently modified data ready for predictive recoveries.

Embodiments disclosed herein further include methods for delta anomaly detection for cyber-security management. Embodiments disclosed herein leverage the intelligent backup metadata and helps security management services to reduce the scope of scanning for anomaly detection. Embodiments disclosed herein may include comparing backup snapshots of specialized directory service assets at different points in time to determine the changed portions of such assets, generating a differencing file that includes (or references) the data that is different between the two backup snapshots, and initiating cyber-security services on the differencing FBB metadata file. In this manner, the entire asset does not have to be re-processed if the data has not changed between backups.

FIG. 1 shows an example system in accordance with one or more embodiments of the invention. The system includes a backup agent (100), one or more clients (120), a production host environment (130), an on-premise backup storage system (150), and one or more secondary storage system(s) (160). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages backup operations of data in the production host environment (130). The backup operations may include generating, storing, and/or recovering file based backups (FBBs) stored in the on-premise backup storage system (150) or secondary storage system(s) (160). In one or more embodiments of the invention, a FBB is a backup of a file system that has been updated, modified, and/or otherwise accessed by the applications (132) in the production host environment (130). The backup agent (100) may perform the method of FIGS. 3A, 4A, and 5A to generate the FBBs and manage the storage and access to the FBBs.

Figure 5A:
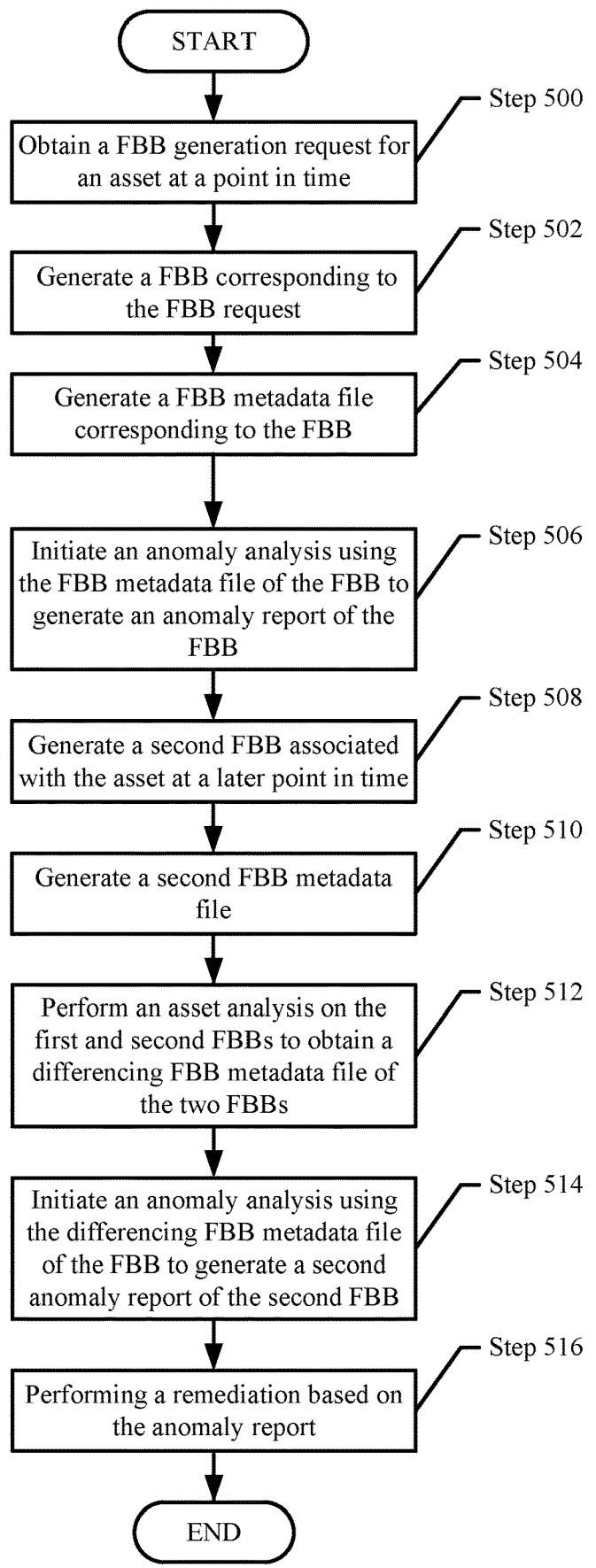
FIG. 5A shows a flowchart for performing delta anomaly detection for security protection in accordance with one or more embodiments of the invention.
Figure 6:
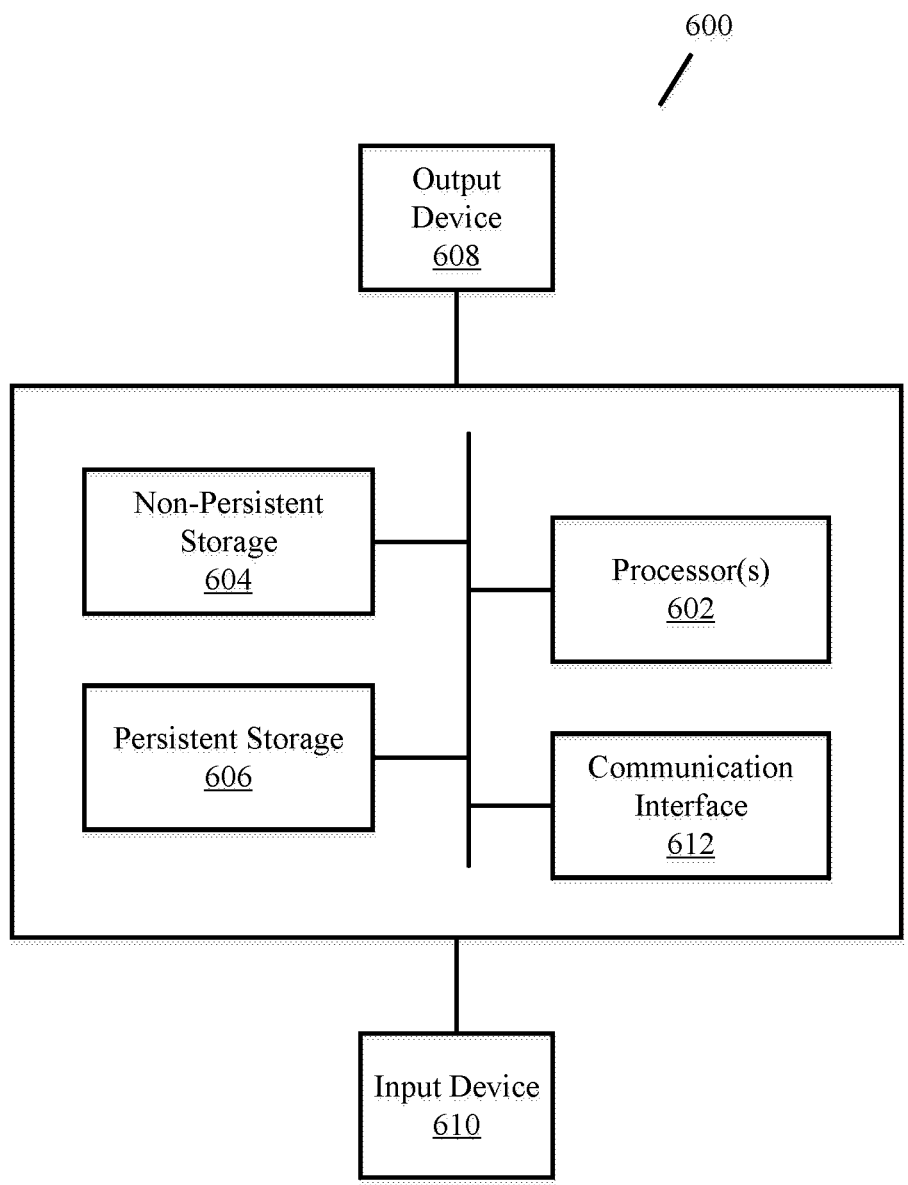
FIG. 6 shows a diagram of a computing device in accordance with one or more embodiments of the invention.

In one or more embodiments of the invention, the backup agent (100) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 3A, 4A, and 5A.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 3A, 4A, and 5A.

While the backup agent (100) is illustrated in FIG. 1 as being a separate entity, the backup agent (100), and any components thereof, may be executed as part of the production host environment (130), the backup storage system (150), the clients (120), and/or any other entities without departing from the invention.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more embodiments of the invention, the applications (132) generate application data to be utilized for the servicing of the users. The application data may be organized in accordance with a file system. The file system may include any number of files organized into directories. For example, the directories may include paths for accessing the files. The file system may be stored in a container stored in the persistent storage (134) of the production host environment (130).

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments, the production host environment (130) may host a specialized directory service (140) that provides one or more mechanisms for accessing data by the applications (132). The specialized directory service (140) may provide a mapping of the data (e.g., a file system) and/or other services for generating, storing, and accessing data stored in the persistent storage (134) of the production host environment (130) and/or from an on-premise backup storage system (150). The specialized directory service (140) may provide user login verification services, storage of directory information, user access management services, application programming interfaces (APIs), certificate services, and domain management services. Other services may be provided by the specialized directory service (140) without departing from the invention. An example of a specialized directory service may be Active Directory.

In one or more of embodiments of the invention, the specialized directory service (140) is implemented as computer instructions, e.g., computer code, stored on a persistent storage (e.g., 134) that when executed by a processor(s) of the production host environment (130) cause the production host environment (130) to provide the functionality of the specialized directory service (140) described throughout this application.

In one or more embodiments, the persistent storage (134) of the production host environment (130) stores backup policies (142) and restored file data (144). The backup policies (142) may specify schedules for backing up data (e.g., files, file systems, specialized directory service databases, directory information, and/or any other data) generated or used by the applications (132). The backup policies (142) may further specify the storage system (150, 160) in which the FBBs (or portions thereof) are to be stored. For example, a backup policy may specify that sub-assets that include specialized directory service databases are to be stored in the on-premise backup storage system (150), and sub-assets that are not associated with a directory service are to be stored in a secondary storage system (160). Additional details of such backup policies (142) may be discussed in FIGS. 3A-3B.

In one or more embodiments, the restored file data (144) may be data that has been restored from the on-premise backup storage system (150), secondary storage systems (160), and/or other storage systems in accordance with restoration procedures initiated by one or more of entities in the system. The restoration procedures may be discussed, for example, in FIGS. 4A-4B.

In one or more embodiments of the invention, the production host environment (130) further includes a FBB metadata file manager (136). In one or more embodiments of the invention, the FBB metadata file manager (136) obtains FBB metadata files, obtains the relevant metadata attributes, and prepares a FBB virtual file system for the applications (132) to use when accessing data in the FBBs stored in the backup storage system (150).

In one or more embodiments of the invention, the production host environment (130) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, the on-premise backup storage systems (150) and the secondary storage systems (160) store FBBs. The FBBs may be backups for file systems. The file systems may be based on files used by the applications (132). The FBBs may each correspond to a point-in-time of the file system. The FBBs may be used to restore the file system to such corresponding point-in-time.

In one or more embodiments, a tiering of the storage of data may be based on the availability of the data in the storage systems (150, 160). For example, the on-premise backup storage systems (150) may be considered a higher tier than the secondary storage systems (160) based on a lower latency in accessing the data in the on-premise backup storage system (150) relative to the secondary storage system(s) (160), and the persistent storage (134) is a higher tier than the on-premise backup storage system (150) and the secondary storage system(s) (160).

In one or more embodiments of the invention, the backup storage system (150) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

In one or more embodiments of the invention, each secondary storage system (160) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the secondary storage system (160) described throughout this application.

In one or more embodiments of the invention, the secondary storage system (160) is implemented as a logical device. The logical device may utilize the computing resources of any number of computing devices and thereby provide the functionality of the secondary storage system (160) described throughout this application.

Figure 2:
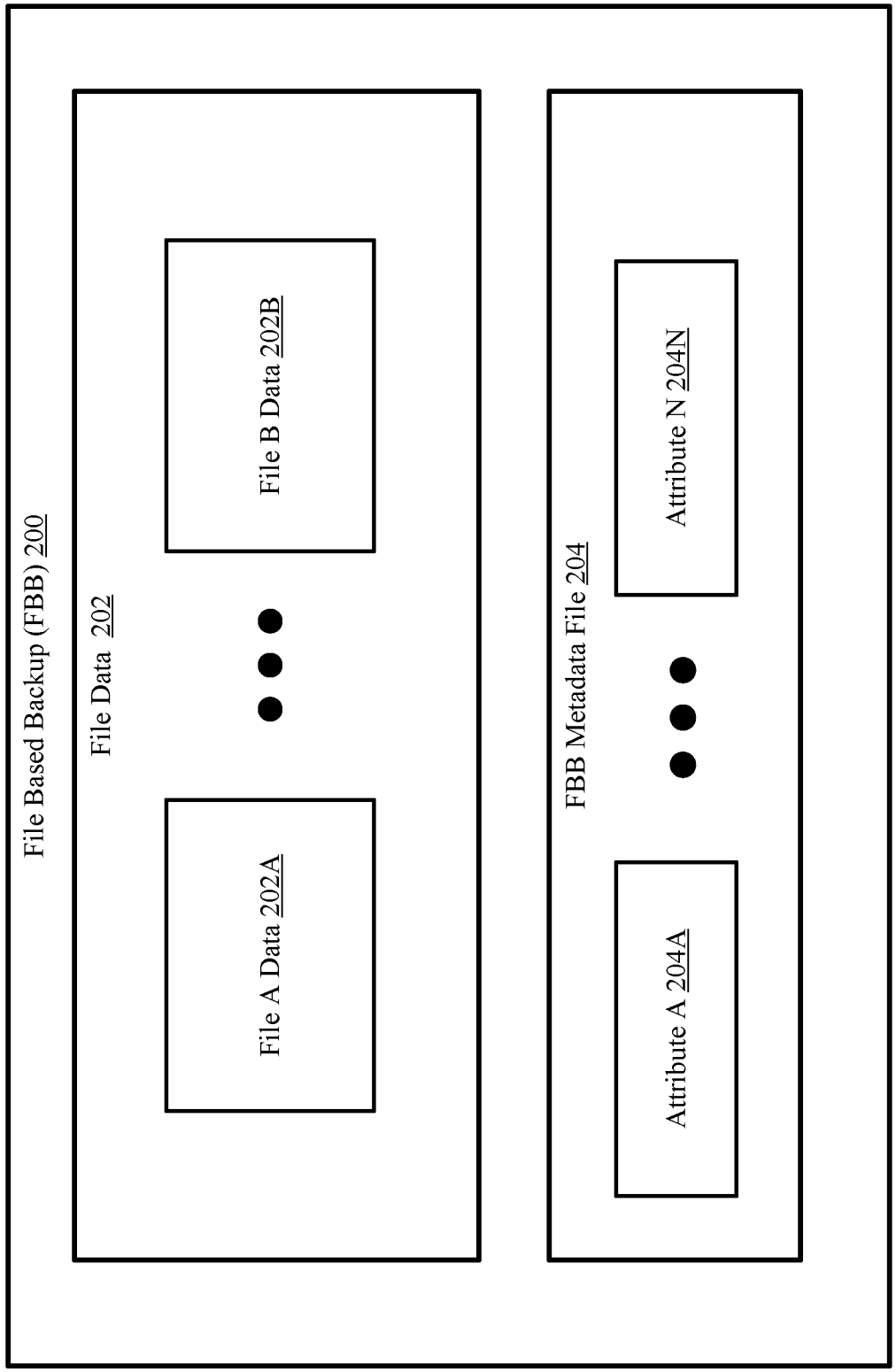
FIG. 2 shows a diagram of a file based backup (FBB) in accordance with one or more embodiments of the invention.

FIG. 2 shows a diagram of a file based backup without departing from the invention. The file based backup (200) may be an embodiment of a file based backup discussed in FIG. 1. As discussed above, the file based backup (200) is a data structure that includes the data in a file system at a point-in-time. The file based backup (200) may include file system data (202) and a FBB metadata file (204).

In one or more embodiments of the invention, the file system data includes data for one or more files (202A, 202B). Each file data (202A, 202B) may correspond to a file in the file system. The file data (also referred to as file system data) may further include data tags. In one or more embodiments of the invention, the data tags may be associated with the storage format of the file data (202A, 202B). For example, the file data (202A, 202B) may be stored in a common data streaming format (CDSF). In one or more embodiments of the invention, the CDSF may be a format that includes the data tags that may correspond to a portion of data and may specify the FBB corresponding to the portion of data. In this manner, the file data (202A, 202B) may include: (i) the data of the files and/or file system and (ii) the data tags that specify the metadata of one or more portions of data of the file data (202A, 202B).

In one or more embodiments of the invention, the FBB metadata file (204) is a data structure that includes metadata corresponding to the files in the file system data (202). The metadata may include attributes (204A, 204N) of a file. Each attribute may describe an aspect of a file. Examples of attributes (204A, 204N) include, but are not limited to: a file identifier, a parent file identifier, a container identifier, a file size, a hash value of the file data, a checksum value of the file data, a header size, an offset of the file in which is stored, and a directory service associated with the file.

In one or more embodiments of the invention, the attributes in the FBB metadata file (204) are grouped into attribute regions. The attribute regions may be groupings of the metadata attributes. The attribute regions may be grouped based on a likelihood of an attribute changing between various iterations of a FBB (e.g., 200).

For example, consider a scenario in which a first attribute (e.g., a file size) changes from a first iteration of a file system of a first FBB to a second iteration of the file system of a second FBB. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

Figure 3A:
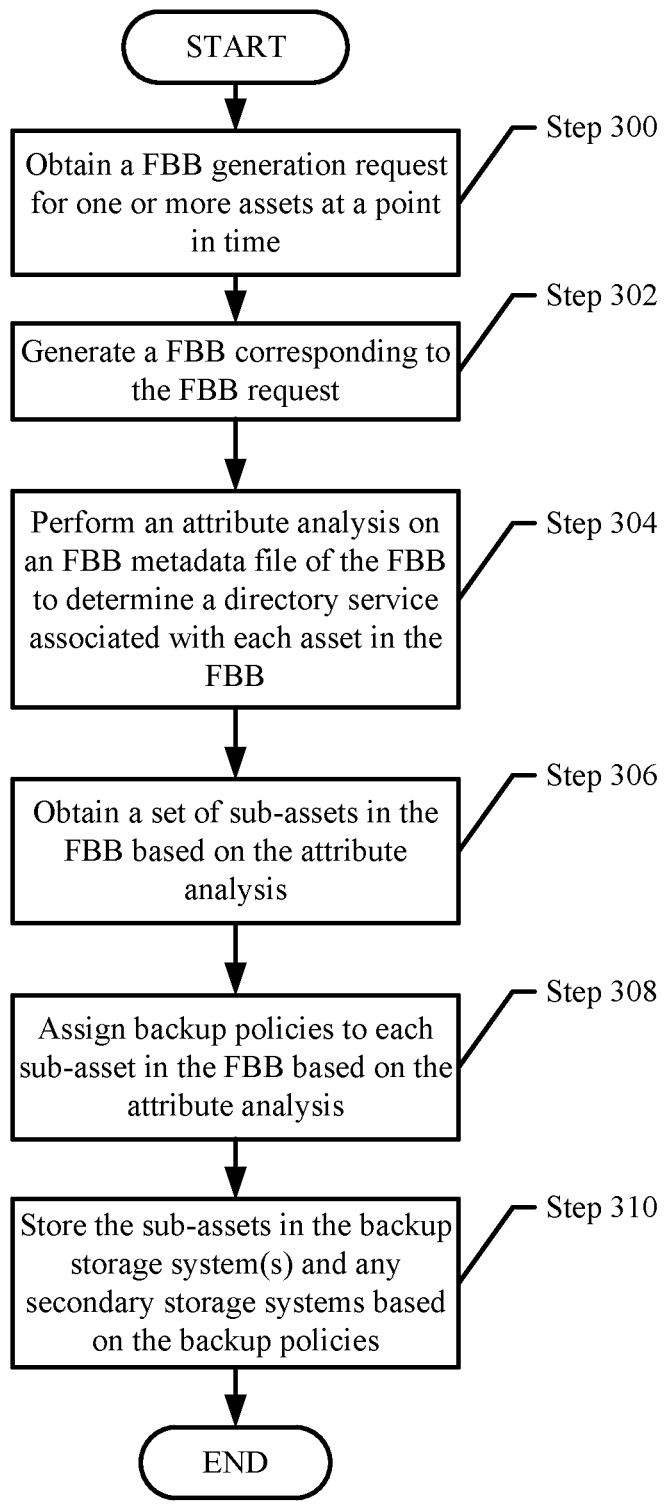
FIG. 3A shows a flowchart for managing backup policies of a set of sub-assets in accordance with one or more embodiments of the invention.
Figure 4A:
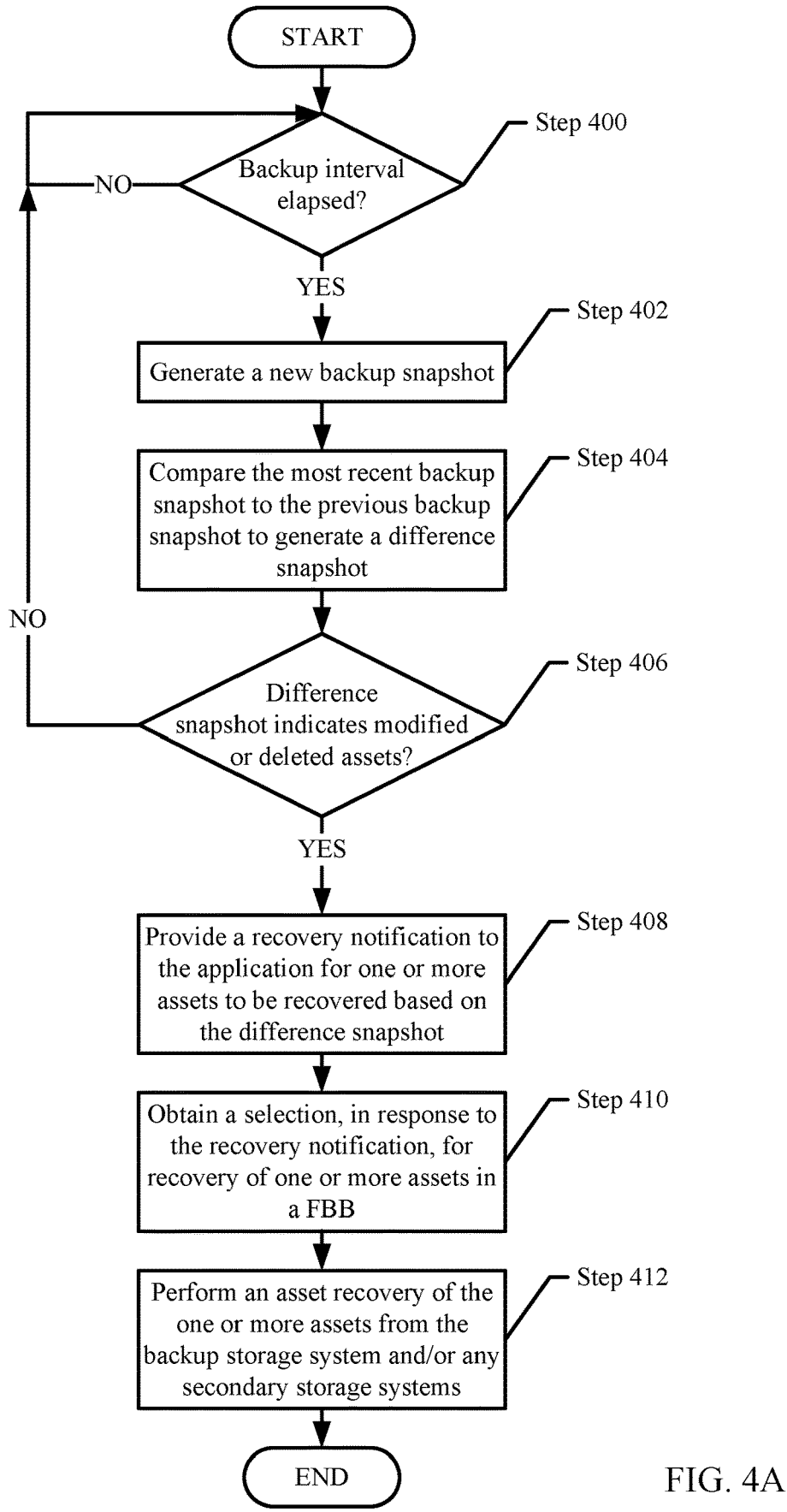
FIG. 4A shows a flowchart for managing proactive asset recovery in accordance with one or more embodiments of the invention.

FIGS. 3A, 4A, and 5A show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A, 4A, and 5A may be performed in parallel with any other steps shown in FIGS. 3A, 4A, and 5A without departing from the scope of the invention.

FIG. 3A shows a flowchart for managing backup policies of a set of sub-assets in accordance with one or more embodiments of the invention. The method shown in FIG. 3A may be performed by, for example, a backup agent (e.g., 100, FIG. 1). Other components of the system illustrated in FIG. 1 may perform the method of FIG. 3A without departing from the invention.

In step 300, a FBB generation request is obtained for one or more assets at a point-in-time. The FBB request may specify generating and storing a FBB of the file system at the point-in-time. The FBB request may specify the storage system (e.g., the backup storage system, a secondary storage system, etc.) in which the FBB is to be stored. The FBB may specify the one or more assets. An asset may be a file, a file system, a directory service database, and/or other data without departing from the invention.

In step 302, a FBB corresponding to the FBB request is generated. In one or more embodiments of the invention, the FBB is generated by generating a copy of the assets in the backup agent. The FBB may be stored in a backup storage system (e.g., the on-premise backup storage system or a secondary backup storage system).

In step 304, an attribute analysis is performed on a FBB metadata file of the FBB to determine a directory associated with each asset in the FBB. In one or more embodiments, the attribute analysis includes determining the portion of the FBB (e.g., assets or portions of assets of the FBB) are associated with a specialized directory service. Each asset is analyzed to make such determination. The attribute analysis may include determining other attributes of the FBB without departing from the invention.

In step 306, a set of sub-assets in the FBB based on the attribute analysis is obtained. In one or more embodiments, each sub-asset is a grouping of assets (or portions thereof) that are associated with a category. For example, a first category may be assets (or portions of assets) that are determined to be associated with a specialized directory service. A second category may be assets (or portions thereof) that are determined to not be associated with the specialized directory service. A third category may be assets (or portions thereof) that are determined to be associated with a directory service that is not the specialized directory service (140, FIG. 1) discussed throughout this disclosure. Each sub-asset may include data of assets (or portions thereof) of one of the aforementioned categories.

In step 308, backup policies are assigned to each sub-asset in the FBB based on the attribute analysis. In one or more embodiments, each sub-asset may be assigned a schedule of the backup policies and a storage location in accordance with the backup policies. For example, a first sub-asset that includes data of specialized directory service may be stored in an on-premise backup storage system in accordance with a backup policy, and a second sub-asset that includes data of non-specialized directory services may be stored in a secondary storage system in accordance with the backup policy. Each backup policy may specify multiple storage locations for a sub-asset without departing from the invention.

Further, a schedule of future backups of the sub-assets may be assigned based on the backup policies. For example, the first sub-asset in the above example may be backed up more frequently than the second sub-asset.

In step 310, the sub-assets are stored in the backup storage system(s) based on the backup policies. In one or more embodiments, the backup agent may transmit the sub-assets to their corresponding storage locations (e.g., an on-premise backup storage system, a secondary storage system, etc.).

To clarify aspects of the invention, a first example is provided that is intended to illustrate the method discussed in FIG. 3A in accordance with one or more embodiments of the invention.

Example 1

Figure 3B:
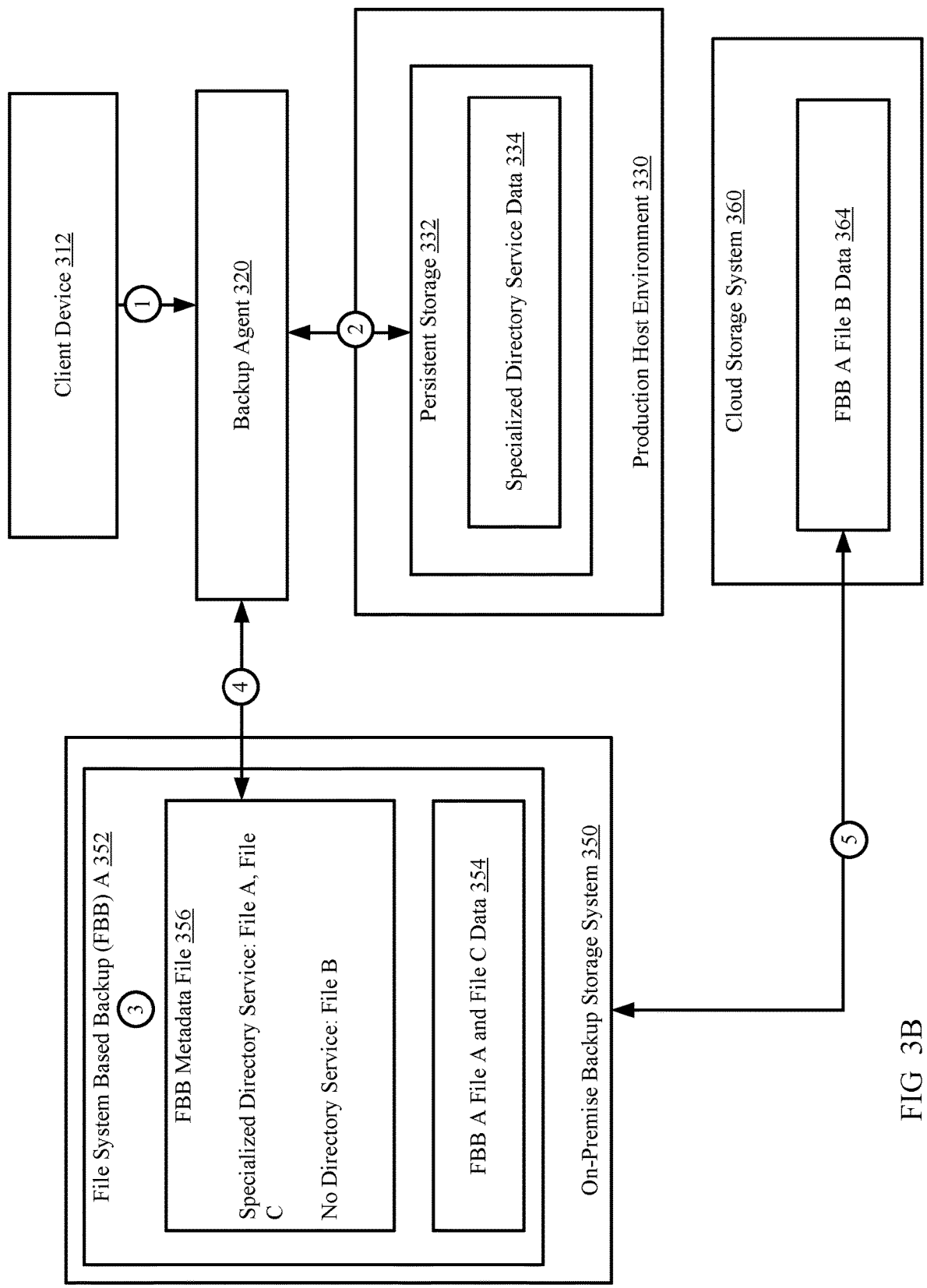
FIG. 3B shows a first example in accordance with one or more embodiments of the invention.

The following section describes an example. The example, illustrated in FIG. 3B, is not intended to limit the invention and is independent from any other examples discussed in this application. Turning to the example, consider a scenario in which a backup storage system stores a file based backup (FBB) in a common data streaming format (CDSF).

FIG. 3B shows a diagram of an example system. The example system includes an on-premise backup storage system (350), a client device (312), a backup agent (320), a cloud storage system (360), and a production host environment (330). For the sake of brevity, not all components of the example system are illustrated in FIG. 3B. The production host environment includes persistent storage (332) that includes specialized directory service data (334) associated with a specialized directory service.

The client device (312) sends a FBB generation request to the backup agent (320) for a FBB that includes an asset that includes files A, B, and C [1]. The backup agent, in response to the FBB generation request, performs the method of FIG. 3A to analyze the files to obtain the data of the files from the persistent storage (332) [2]. Further, the backup agent (320) generates the FBB in accordance with the FBB generation request and stores the FBB in the on-premise backup storage system (350) [3]. The on-premise backup storage system (350) includes FBB A (352) which includes FBB A data (354) and a FBB metadata file (356).

The backup agent (320) after generating the FBB (352), consults the FBB metadata file (356) to perform the attribute analysis [4]. The attribute analysis includes determining which of the three files are associated with the specialized directory service. According to the FBB metadata file (356), file A and file C are associated with the specialized directory service, and file B is not associated with any directory service.

Based on the attribute analysis, the backup agent (320) separates the files into sub-assets. Specifically, files A and C are associated with a first sub-asset based on their association with the specialized directory service, and file B is associated with a second sub-asset. Each sub-asset is assigned a backup policy. Specifically, the first sub-asset is assigned a backup policy that specifies storing the sub-asset in the on-premise backup storage system (350) and generating future backups every 24 hours. The second sub-asset is assigned a backup policy that specifies storing the sub-asset in the cloud storage system (360) (e.g., a secondary storage system) and generating future backups of the sub-asset every 48 hours. Based on the assignment, a backup of the second sub-asset is stored in the cloud storage system (360) [5]. In this manner, the file B data (364) is accessible from the cloud storage system (360), and the data for files A and C (354) are accessible from the on-premise backup storage system (350).

End of Example 1

FIG. 4A shows a flowchart for managing proactive asset recovery in accordance with one or more embodiments of the invention. The method shown in FIG. 4A may be performed by, for example, a backup agent (e.g., 100, FIG. 1). Other components of the system illustrated in FIG. 1 may perform the method of FIG. 4A without departing from the invention.

In step 400, a determination is made about whether a backup interval elapsed. If a backup interval elapsed, the method proceeds to step 402; otherwise, the method waits a pre-determined amount of time before returning to step 400.

In step 402, a new backup snapshot is generated. In one or more embodiments, the backup snapshot is generated after a pre-determined time interval. The backup snapshot may be associated with a point-in-time. The backup snapshot may specify each file in an asset at the point-in-time. Further, the backup snapshot may include a unique identifier that is based on a most recent modification of each file. For example, the unique identifier may be a hash value of the data associated with the file. As a second example, the unique identifier may be a hash value of a timestamp of the most recent time the file was opened by an application. The unique identifiers may be associated with other information without departing from the invention.

In one or more embodiments, each backup snapshot may be associated with a FBB. Specifically, a FBB may be generated using the backup snapshot and in accordance with any method discussed throughout this disclosure. For example, the FBB may be generated in accordance with FIG. 3A.

In step 404, the most recent backup snapshot is compared to the previous backup snapshot to generate a difference snapshot. In one or more embodiments, the difference snapshot is a data structure identical in format to the backup snapshots generated in step 402. The difference snapshot may specify the files that are specified in the previous backup snapshot and not specified in the most recent backup snapshot due to the file(s) having been deleted between the point-in-time of the previous backup snapshot (i.e., a first point-in-time) and the point-in time of the most recent backup snapshot (i.e., a second point-in-time). Further, the difference snapshot may specify any files that have been modified between the first point-in-time and the second point-in-time. The modification of such files may be determined by comparing the unique identifiers of each file in the two backup snapshots and including in the difference snapshot each file with different unique identifiers.

In step 406, a determination is made about whether the difference snapshot indicates modified or deleted assets (e.g., files). If the difference snapshot indicates modified or deleted assets, the method proceeds to step 408; otherwise, the method returns to step 400.

In step 408, after the determination is made that a difference snapshot indicates modified or deleted assets, a recovery notification is provided to the application for one or more assets to be recovered based on the difference snapshot. In one or more embodiments, the recovery notification specifies at least one or more of the assets in the difference snapshots and a suggestion to recover any of the assets specified in the difference snapshot.

In step 410, in response to the recovery notification, a selection is obtained for recovery of one or more assets in a FBB. In response to the recovery notification, the application may respond to select one or more of the assets to be recovered. Specifically, the application may specify transferring the selected asset(s) from their corresponding storage location (e.g., the backup storage system or a secondary storage system) to be transmitted to a higher-tier storage system. For example, if a selected asset is currently stored in the secondary storage system, the response may specify transmitting the selected asset to the on-premise backup storage system for higher access.

In step 412, an asset recovery is performed of the one or more assets to obtain the assets from a backup storage system and/or any secondary storage systems. In one or more embodiments, the asset recovery includes obtaining each selected asset(s) from its corresponding storage location(s) and transmitting the selected asset(s) to the higher tiered storage system (e.g., the production host or the on-premise backup storage system). The asset recovery may further include reverting a selected assets to the first point-in-time if the selected asset was modified (rather than deleted) from the first point-in-time to the second point-in-time. In this manner, the selected assets are accessible to the application despite having been modified and/or deleted.

In one or more embodiments, the asset recovery is performed prior to step 408. By performing the asset recovery prior to sending the recovery notification, the assets are available before the application is notified of the deleted and/or modified assets, thus reducing the time taken between the selection and the recovery.

To clarify aspects of the invention, a second example is provided that is intended to illustrate the method discussed in FIG. 4A in accordance with one or more embodiments of the invention.

Example 2

Figure 4B:
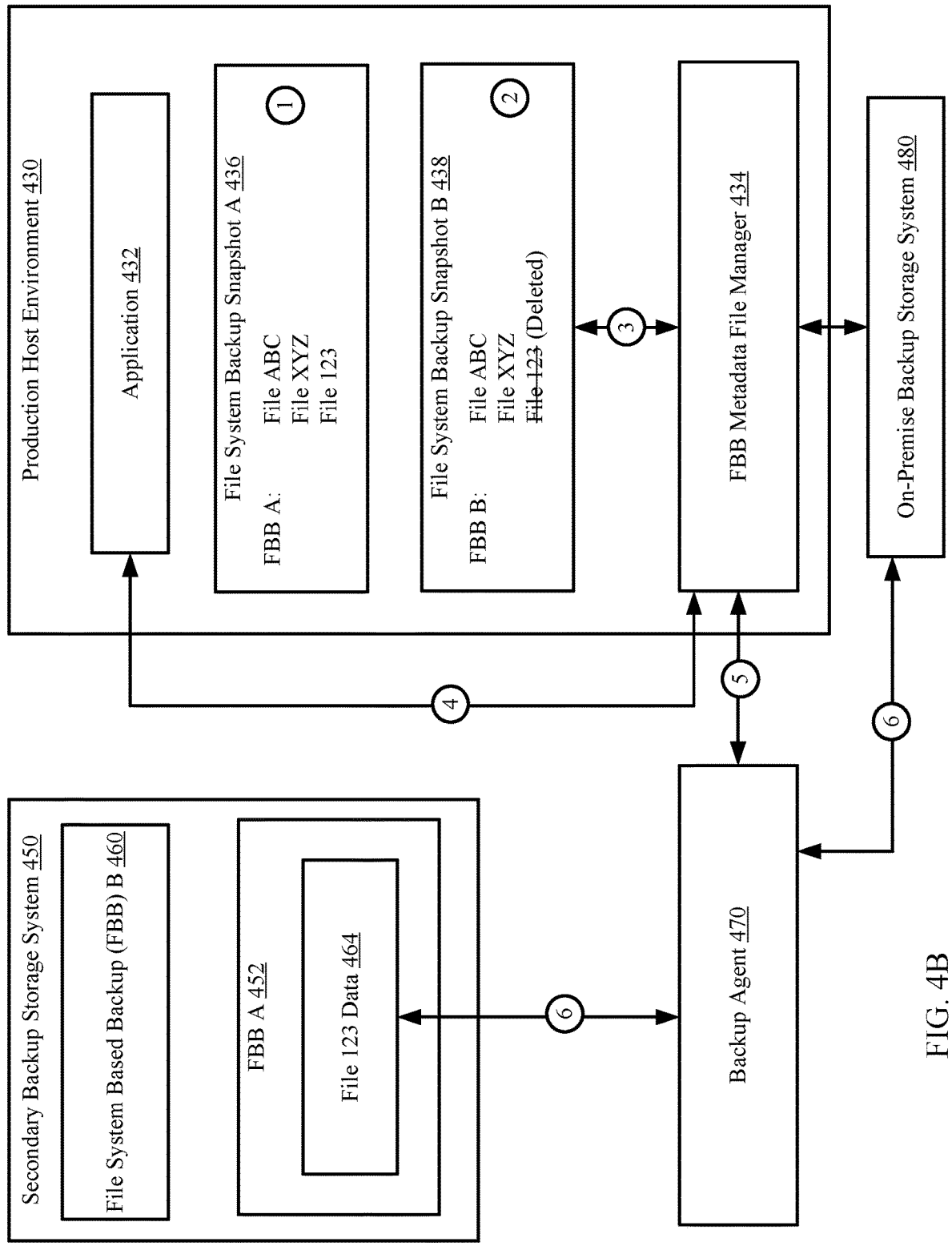
FIG. 4B shows a second example in accordance with one or more embodiments of the invention.

The following section describes an example. The example, illustrated in FIG. 4B, is not intended to limit the invention and is independent from any other examples discussed in this application. Turning to the example, consider a scenario in which a backup storage system stores a file based backup (FBB) in a common data streaming format (CDSF).

FIG. 4B shows a diagram of an example system. The example system includes an on-premise backup storage system (480), a secondary backup storage system (450), a client device (312), a backup agent (470), and a production host environment (430). For the sake of brevity, not all components of the example system are illustrated in FIG. 4B. The production host environment includes a metadata file manager (434) and an application (432).

At a first point-in-time, a first backup snapshot is generated [1]. The first backup snapshot (436) specifies files ABC, XYZ, and 123. A corresponding FBB A (452) is generated and stored in the secondary backup storage system (452). At a second point-in-time, a second backup snapshot is generated [2]. The second backup snapshot (438) specifies files ABC and XYZ. The second backup snapshot (438) does not specify file 123. This indicates that the application (432) deleted file 123 from the production host environment (430) between the first point-in-time and the second point-in-time.

An FBB metadata file manager (434) performs the method of FIG. 4A to compare the two backup snapshots (436, 438) and generate a difference snapshot (not shown) [3]. The difference snapshot specifies file 123. The FBB metadata file manager (434) sends a recovery notification to the application (432) that specifies the recovery of file 123 to the on-premise backup storage system (480) [4]. The application (432) selects file 123 as requested to be recovered. The FBB metadata file manager (434), in response to the selection, initiates a recovery of the file. Specifically, the FBB metadata file manager (434) sends a recovery request to the backup agent (470) [5]. The backup agent (470), in response to the recovery request, obtains the file data for file XYZ from the FBB (460) and stores the file in the on-premise backup storage system (480) [6].

End of Example 2

FIG. 5A shows a flowchart for managing proactive asset recovery in accordance with one or more embodiments of the invention. The method shown in FIG. 5A may be performed by, for example, a backup agent (e.g., 100, FIG. 1). Other components of the system illustrated in FIG. 1 may perform the method of FIG. 5A without departing from the invention.

In step 500, a FBB generation request is obtained for an asset at a point-in-time. The FBB request may specify generating and storing a FBB of the file system at the point-in-time. The FBB request may specify the storage system (e.g., the backup storage system, a secondary storage system, etc.) in which the FBB is to be stored. The FBB may specify the one or more assets. An asset may be a file, a file system, a directory service database, and/or other data without departing from the invention.

In step 502, a FBB corresponding to the FBB request is generated. In one or more embodiments of the invention, the FBB is generated by generating a copy of the assets in the backup agent. The FBB may be stored in a backup storage system (e.g., the on-premise backup storage system or a secondary backup storage system).

In step 504, a FBB metadata file is generated corresponding to the FBB. In one or more embodiments of the invention, the FBB metadata file is generated by generating metadata attributes corresponding to each file in the assets of the FBB. The metadata file may be populated based on the corresponding attributes of the copy of the data associated with the assets (e.g., file name identifiers, file size, etc.). The storage location attributes of the FBB metadata file may be generated based on the storage of the FBB in the backup storage system as performed in step 502.

In step 506, an anomaly analysis is initiated using the FBB metadata file of the FBB to generate an anomaly report of the FBB. In one or more embodiments, an anomaly analysis is a process for scanning each file in an asset to detect any cyber-security anomalies and specify such anomalies in the anomaly report. The anomaly analysis may be initiated by prompting a cyber-security component of the system to perform the scanning and request the anomaly report. The scanning may include detecting whether any encryption was performed on the file, whether any malicious entities (e.g., executable malware) is stored in the file, whether the data of a file is corrupted, and/or whether the data is otherwise inaccessible.

In one or more embodiments, the anomaly analysis is performed using the FBB metadata file by reading the storage locations specified in the FBB metadata files to access the data in the FBBs. In this manner, the cyber-security component performing the anomaly analysis may recognize the format of the FBB metadata file.

In one or more embodiments, if the anomaly report indicates corrupted or otherwise inaccessible files, a remediation may be performed. The remediation may include recovering any affected files (e.g., corrupted or inaccessible files) from an earlier backup, regenerating a backup of the file, and/or notifying a user of the affected data.

In step 508, a second FBB associated with the asset is generated at a later point-in-time. Similar to step 502, the second FBB is generated by generating a copy of the assets in the backup agent at the second point-in-time. The FBB may be stored in a backup storage system (e.g., the on-premise backup storage system or a secondary backup storage system).

In step 510, a second FBB metadata file is generated. Similar to 504, the second FBB metadata file is generated by generating metadata attributes corresponding to each file in the assets of the second FBB. The metadata file may be populated based on the corresponding attributes of the copy of the data associated with the assets (e.g., file name identifiers, file size, etc.). The storage location attributes of the second FBB metadata file may be generated based on the storage of the second FBB in the backup storage system as performed in step 508.

In step 512, an asset analysis is performed on the first and second FBBs to obtain a differencing FBB metadata file of the two FBBs. In one or more embodiments, the asset analysis includes comparing the files in the two FBBs to determine any changes between the first two FBBs (e.g., deleted data and/or modified files). The comparison may be performed using the two FBB metadata files. The FBB metadata files may each specify the files of their corresponding FBBs. The differencing FBB metadata file may specify the files that have been deleted or modified between the first point-in-time and the second point-in-time. The differencing FBB metadata file may be in a similar format to the two FBB metadata files discussed above. For example, the differencing FBB metadata may specify the storage attributes of the specified files that are deleted and/or modified between the two points-in-time.

In step 514, an anomaly analysis is initiated using the differencing FBB metadata file of the second FBB to generate a second anomaly report of the second FBB. Similar to the anomaly analysis of step 506, the anomaly analysis is a process for scanning each file in an asset to detect any cyber-security anomalies and specify such anomalies in the anomaly report. The anomaly analysis may include detecting whether any encryption was performed on each file specified in the differencing FBB metadata file, whether any malicious entities (e.g., executable malware) is stored in the file, whether the data of a file is corrupted, and/or whether the data is otherwise inaccessible.

By performing the anomaly analysis on the differencing FBB metadata file instead of the second FBB metadata file, the resources of the cyber-security component are reserved for the changes in data between the two FBBs. In this manner, the data that was already scanned in the first FBB does not need to be re-scanned in the second anomaly analysis of step 514.

In step 516, a remediation is performed based on the anomaly report. In one or more embodiments, the remediation may include recovering any affected files (e.g., corrupted or inaccessible files) from an earlier backup, regenerating a backup of the file, and/or notifying a user of the affected data.

To clarify aspects of the invention, a second example is provided that is intended to illustrate the method discussed in FIG. 5A in accordance with one or more embodiments of the invention.

Example 3

Figure 5B:
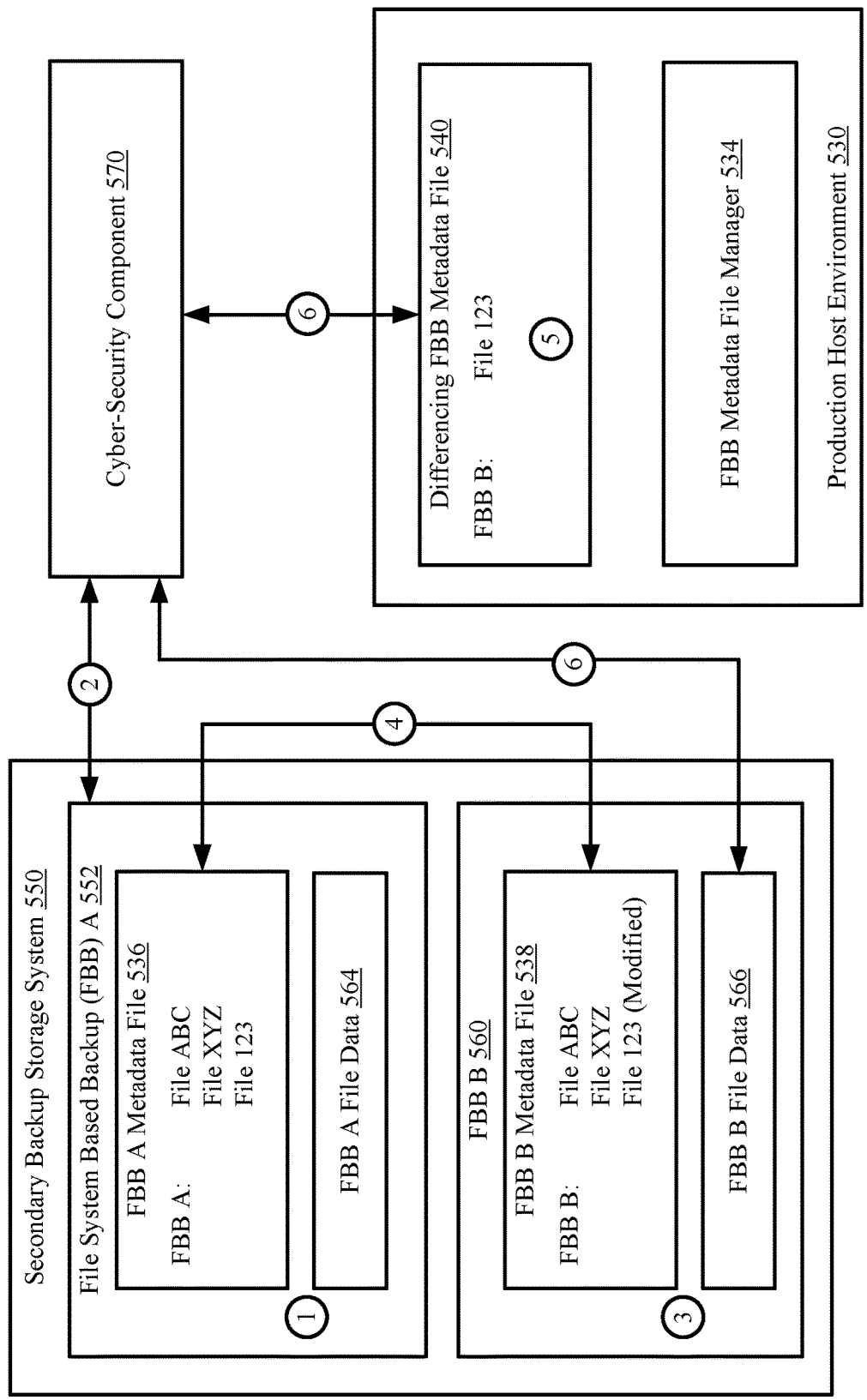
FIG. 5B show an example in accordance with one or more embodiments of the invention.

The following section describes an example. The example, illustrated in FIG. 5B, is not intended to limit the invention and is independent from any other examples discussed in this application. Turning to the example, consider a scenario in which a backup storage system is protected via a monitoring performed by a cyber-security component.

FIG. 5B shows a diagram of an example system. The example system includes a secondary backup storage system (550), a cyber-security component (570), and a production host environment (530). For the sake of brevity, not all components of the example system are illustrated in FIG. 4B. The production host environment includes a FBB metadata file manager (534) and an application (432).

At a first point-in-time, first file based backup (FBB) A is generated [1]. FBB A (552) includes FBB A metadata file (536) and file data (564). FBB A (552) is stored in the secondary backup storage system (550). FBB A (552) includes data for files ABC, XYZ, and 123. The cyber-security component (570) performs an anomaly analysis by scanning the FBB A file data (564) using the FBB A metadata file (536) [2].

At a second point-in-time, FBB B (560) is generated [3]. FBB B (560) includes FBB B metadata file (538) and file data (566). FBB B (560) is stored in the secondary backup storage system (550). FBB B (560) includes data for files ABC, XYZ, and 123. Between the first point-in-time and the second point-in-time, file 123 was modified.

The FBB metadata file manager (534) performs the method of FIG. 5A to compare the two FBB metadata files (536, 538) and generate a differencing FBB metadata file (540) [4, 5]. The differencing FBB metadata file (540) specifies file 123 due to being a modified file that is different between the two FBB metadata files (536, 538). The cyber-security component (570) uses the differencing FBB metadata file (540) to perform a second anomaly analysis on FBB B (560) by scanning the file data (566) that is specified in the differencing FBB metadata file (540) [6]. In this manner, the cyber-security component (570) does not waste time nor resources re-scanning files ABC and XYZ as they were already scanned in FBB A (552) and not changed between the two backups (552, 560).

End of Example 3

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the operation of the storage and access of data associated with specialized directory services backed up and stored in a backup storage system. Embodiments of the invention categorize the data based on the type of directory service (if any) associated with regions of an asset.

Embodiments of the invention further include proactively providing the ability to quickly restore data that may have been deleted or modified by a user in a production host environment. If the data was backed up prior to the deletion and/or modification, embodiments disclosed herein enable quick access to the backed up data and notifying the user of such access.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing access to file based backups (FBBs), the method comprising:
    generating, at a first point-in-time, a first backup snapshot at a first point-in-time,
        wherein the first backup snapshot specifies a first set of files of an asset at the first point-in-time;
    generating, at a second point-in-time after the first point-in-time, a second backup snapshot at a second point-in-time,
        wherein the second backup snapshot specifies a second set of files of the asset at the second point-in-time,
        wherein the first set of files are backed up in a first FBB stored in a secondary backup storage system, and
        wherein the second set of files are backed up in a second FBB stored in the secondary backup storage system;

comparing the first backup snapshot and the second backup snapshot to generate a difference snapshot, wherein the difference snapshot specifies a third set of files that are different between the first set of files and the second set of files;

providing a recovery notification to an application accessing the asset, wherein the recovery notification specifies recovering a file in the third set of files;

obtaining a selection of the file in the third set of files from the application; and in response to the selection, performing a recovery of the file, wherein performing the recovery comprises transmitting a copy of the file from the secondary backup storage to an on-premise backup storage system, wherein the on-premise backup storage system is accessible to the application from a higher tier of storage compared to the secondary backup storage system, and wherein the secondary backup storage system comprises only a lower tier of storage compared to the on-premise backup storage system.

2. The method of claim 1, wherein the file in the third set of files is deleted in the first set of files and not specified in the second set of files.

3. The method of claim 1, wherein the recovery of the file comprises:

making a determination that the file was modified between the first point-in-time and the second point-in-time; and reverting the file to the first point-in-time.

4. The method of claim 1, wherein the first set of files and the second set of files are associated with a specialized directory service.

5. The method of claim 4, wherein the specialized directory service comprises a set of secondary services for accessing the first set of files in the asset.

6. A non-transitory computer readable medium comprising computer readable program code, which when executed by a computer processor enables the computer processor to perform a method for managing access to file based backups (FBBs), the method comprising:

generating, at a first point-in-time, a first backup snapshot at a first point-in-time, wherein the first backup snapshot specifies a first set of files of an asset at the first point-in-time;

generating, at a second point-in-time after the first point-in-time, a second backup snapshot at a second point-in-time, wherein the second backup snapshot specifies a second set of files of the asset at the second point-in-time, wherein the first set of files are backed up in a first FBB stored in a secondary backup storage system, wherein the second set of files are backed up in a second FBB stored in the secondary backup storage system;

comparing the first backup snapshot and the second backup snapshot to generate a difference snapshot, wherein the difference snapshot specifies a third set of files that are different between the first set of files and the second set of files;

providing a recovery notification to an application accessing the asset, wherein the recovery notification specifies recovering a file in the third set of files;

obtaining a selection of the file in the third set of files from the application; and in response to the selection, performing a recovery of the file, wherein performing the recovery comprises transmitting a copy of the file from the secondary backup storage to an on-premise backup storage system, wherein the on-premise backup storage system is accessible to the application from a higher tier of storage compared to the secondary backup storage system, and wherein the secondary backup storage system comprises only a lower tier of storage compared to the on-premise backup storage system.

7. The non-transitory computer readable medium of claim 6, wherein the file in the third set of files is deleted in the first set of files and not specified in the second set of files.

8. The non-transitory computer readable medium of claim 6, wherein the recovery of the file comprises:

making a determination that the file was modified between the first point-in-time and the second point-in-time; and reverting the file to the first point-in-time.

9. The non-transitory computer readable medium of claim 6, wherein the first set of files and the second set of files are associated with a specialized directory service.

10. The non-transitory computer readable medium of claim 9, wherein the specialized directory service comprises a set of secondary services for accessing the first set of files in the asset.

11. A system comprising:

a processor; and memory comprising instructions, which when executed by the processor, perform a method comprising:

generating, at a first point-in-time, a first backup snapshot at a first point-in-time, wherein the first backup snapshot specifies a first set of files of an asset at the first point-in-time, wherein the first set of files are backed up in a first FBB stored in a secondary backup storage system, and wherein the second set of files are backed up in a second FBB stored in the secondary backup storage system;

generating, at a second point-in-time after the first point-in-time, a second backup snapshot at a second point-in-time, wherein the second backup snapshot specifies a second set of files of the asset at the second point-in-time;

comparing the first backup snapshot and the second backup snapshot to generate a difference snapshot, wherein the difference snapshot specifies a third set of files that are different between the first set of files and the second set of files;

providing a recovery notification to an application accessing the asset, wherein the recovery notification specifies recovering a file in the third set of files;

obtaining a selection of the file in the third set of files from the application; and in response to the selection, performing a recovery of the file, wherein performing the recovery comprises transmitting a copy of the file from the secondary backup storage to an on-premise backup storage system, wherein the on-premise backup storage system is accessible to the application from a higher tier of storage compared to the secondary backup storage system, and wherein the secondary backup storage system comprises only a lower tier of storage compared to the on-premise backup storage system.

12. The system of claim 11, wherein the file in the third set of files is deleted in the first set of files and not specified in the second set of files.

13. The system of claim 11, wherein the recovery of the file comprises:
   making a determination that the file was modified between the first point-in-time and the second point-in-time; and
   reverting the file to the first point-in-time.

14. The system of claim 11, wherein the first set of files and the second set of files are associated with a specialized directory service.

* * * * *